United States Patent
Ebbeson

(10) Patent No.: US 6,213,197 B1
(45) Date of Patent: Apr. 10, 2001

(54) AIR CONDITIONING APPARATUS AS WELL AS COMPONENTS THEREOF

(75) Inventor: Bengt Ebbeson, Ettenhausen (CH)

(73) Assignee: Electrolux Leisure Appliances AG, Frauenfeld (CH)

( * ) Notice: Subject to any disclaimer, the term of this patent is extended or adjusted under 35 U.S.C. 154(b) by 0 days.

(21) Appl. No.: 09/113,416

(22) Filed: Jul. 10, 1998

(30) Foreign Application Priority Data

Jul. 14, 1997 (DE) .............................................. 197 30 136

(51) Int. Cl.[7] ....................................................... F28F 3/00
(52) U.S. Cl. .................. 165/166; 165/110; 165/104.12; 62/478; 62/476; 159/28.6; 159/31; 202/183; 202/184
(58) Field of Search ................... 165/104.12, 104.11, 165/166, 110; 62/477, 476, 478, 480, 484; 159/28.6, 31; 202/183, 184

(56) References Cited

U.S. PATENT DOCUMENTS

| | | | |
|---|---|---|---|
| 3,743,782 | * 7/1973 | Laing | 165/166 X |
| 4,461,733 | * 7/1984 | Otterbein | 165/166 X |
| 4,477,396 | * 10/1984 | Wilkinson | 62/484 X |
| 4,509,592 | * 4/1985 | Yamada et al. | 165/166 |
| 4,544,513 | * 10/1985 | Otterbein | 165/166 X |
| 4,660,629 | * 4/1987 | Maier-Laxhuber et al. | 165/104.12 |
| 4,997,031 | * 3/1991 | Kashiwada et al. | 165/166 X |
| 5,054,544 | 10/1991 | Maier-Laxhuber et al. | 165/104.12 |
| 5,351,504 | * 10/1994 | Giacometti et al. | 62/484 X |
| 5,558,748 | * 9/1996 | Dugan | 165/166 X |
| 5,927,097 | * 7/1999 | Wright | 165/166 X |
| 5,944,094 | * 8/1999 | Kinney, Jr. et al. | 165/166 |

FOREIGN PATENT DOCUMENTS

| | | | | |
|---|---|---|---|---|
| 0103297 | * | 6/1985 | (JP) | 165/104.12 |
| 405157400 | * | 6/1993 | (JP) | 62/478 |

* cited by examiner

Primary Examiner—Christopher Atkinson
(74) Attorney, Agent, or Firm—Pearne & Gordon LLP

(57) ABSTRACT

A sorption unit for air-conditioning technology apparatus with sheets for heat emission, past which water vapor is passed. The sheets are provided with zeolite, that forms string-shaped profiled bodies which are designed to have surface contact with the sheets. Channels for vapor passage are defined between bodies arranged one beside the other. A buffer section and a condenser/evaporator unit complete the sorption unit to form an air-conditioning system.

6 Claims, 7 Drawing Sheets

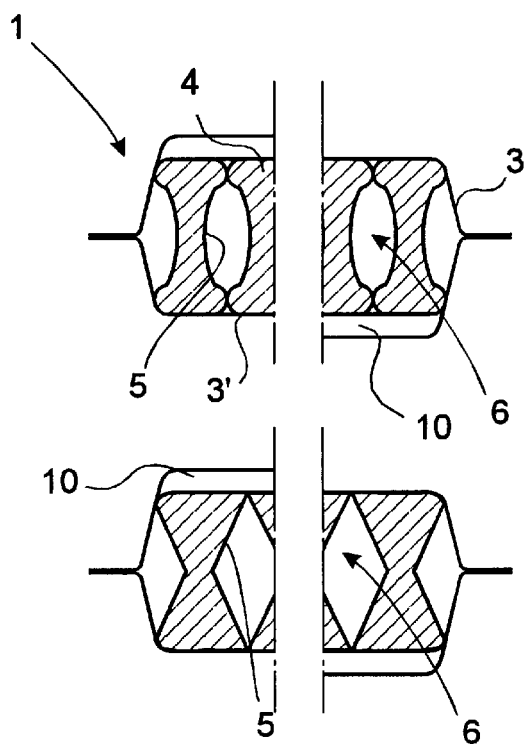
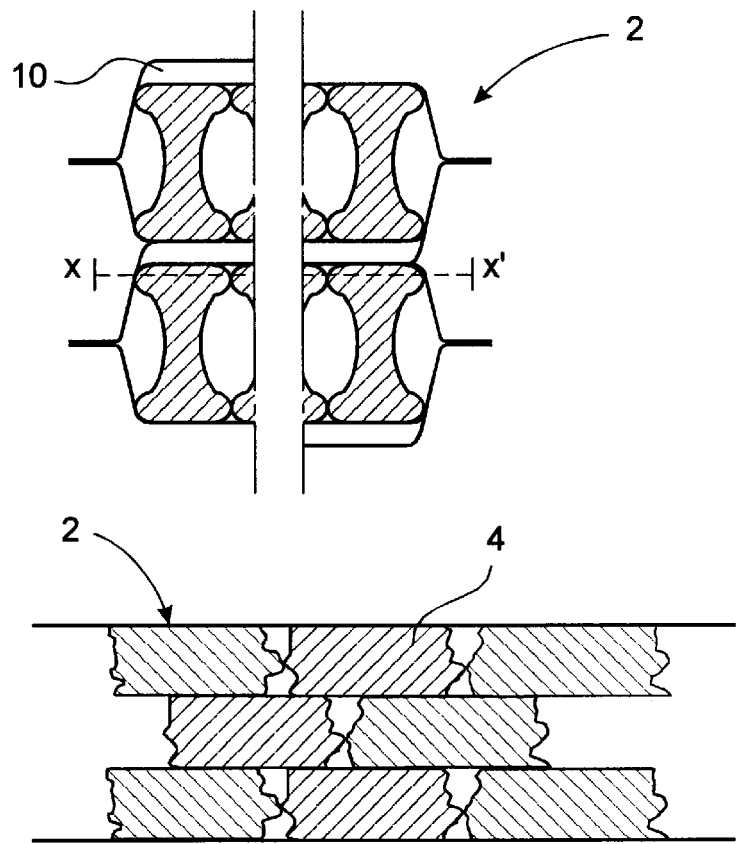
Fig. 1
Fig. 2
Fig. 3
Fig. 4

AIR CONDITIONING APPARATUS AS WELL AS COMPONENTS THEREOF

BACKGROUND OF THE INVENTION

The present invention pertains to a sorption unit in accordance with the preamble of patent claim 1, to buffer means in accordance with the preamble of patent claim 2, to a condenser/evaporator unit in accordance with the preamble of patent claims 3 and/or 4, respectively, and to an air conditioning apparatus composed of these components, in accordance with the preamble of patent claim 6.

The aim of air conditioning rooms on one hand lies in the continuous air replacement and on the other hand in creating defined temperature and climatic conditions, i.e. regulation of air temperature, moisture and/or filtering of air. Air conditioning in the sense of the present invention in first place is a change in temperature either by an "air conditioning system" for cooling, a heat pump system or another application.

In air-conditioning in terms of temperature presently e.g. methods are used in which the sorption action is initiated by cooling down a sorption part and an working medium is evaporated in an evaporator. The working mediums is exothermally absorbed in a sorption medium and in a subsequent endothermic reaction (regeneration phase) again is resorbed.

The apparatus used for realization of this method is described in DE 42 33 062 and essentially consists of several elongated sorption vessels (cooker absorber part) which over a part of their length are filled with zeolite serving as sorption medium and in this part form an adsorber. The other part of the length forms a condenser/evaporator zone (evaporator). The sorption vessels are rotating in two coaxial housings on an orbit and therein are located with the cooker absorber part in one housing and with the evaporator part in the other housing. The housing enclosing the cooker absorber parts comprises an entry and an outlet for a gaseous heat carrier medium so that the heat carrier medium on its flow path through the housing withdraws heat from the cooker absorber parts as well as supplies heat thereto.

The cooker absorber part comprises elongated flat hollow bodies bent in cross-sectional area, which are produced from high-grade steel sheets of appx. 0.1 mm thickness, the surface of these sheets is smooth. On the bottom sides, sheets bent in wave-like manner are arranged. On the crest lines of the waves the sheets are mutually connected by rotary welding seams or by laser treatment. The sheets of about 600 mm length and 80 mm width are coated with zeolite, the zeolite layer during manufacture being applied in a multiple layer coating process. The bends touch the smooth high-grade steel sheet and thereby are supporting it. By this shape channels are formed through which the water vapor is guided.

It is in particular the costly manufacture which results from the fact that at first the sheet must be shaped and coated with zeolite, wherein such coating may be carried out in one or in several layers. A further disadvantage has to be seen in the fact that the zeolite layer has to be applied in thin layer, because zeolite is not a good thermal conductor and gas permeability of zeolite is not very good.

The major problem, however, results from the fact that the connection between the sheet and the zeolite frequently is not permanent, since the steel sheet during rotation passes hot and cold temperature zones and consequently is subject to continually changing thermal expansion (e.g. in the case when the sheets form the blades of a rotor). For this reason it may occur that during operation zeolite layers become detached—either in some areas or completely—so that the coating is destroyed, the channels are blocked or the thermal transition is carried out ununiformly. In the places where the zeolite layer is destroyed, the function of the sheets and/or the rotor comprising the sheets is worsened.

A further aggravation of the air-conditioning apparatus results from the problems in the evaporator area. The generic evaporator—as well as the temperature insulation area between evaporator and sorption zone (called buffer means)—include the problem that it is not avoided sufficiently that during adsorption of the water in zeolite also larger water drops are entrained by the evaporator to enter the sorption unit so that water drops can enter the zeolite portion directly. This impairs efficiency of the air-conditioning system, since the water drops have not absorbed heat from the room surrounding the evaporator.

SUMMARY OF THE INVENTION

It is, therefore, the object of the present invention to further develop the generic air-conditioning apparatus as well as its components in such manner that a simple and cost-saving manufacture will result, wherein the function of the apparatus and its components are to still be guaranteed also after longer operation time.

The invention achieves this aim with respect to the components sorption unit, buffer means and condenser/evaporator unit by the subject matters of claims 1, 2, 3 and 4 and with respect to the apparatus—by the subject matter of claim 6.

Preferred embodiments of the invention can be taken from the subclaims.

The present invention creates a sorption unit for air-conditioning and heat technology apparatus comprising sheets for heat dissipation, past which a working medium is guided, said sheets being in contact with a sorption medium forming string-shaped profiled bodies of such design that the have flat contact with the sheets and that channels for passage of the working medium are formed by means of the string-shaped profiled bodies. As sorption agent e.g. zeolite can be used and as working medium—water which evaporates in an evaporator and is adsorbed in the zeolite. Instead of the matter combination water/zeolite also other combinations known per se, e.g. ammonia/carbon, water/salt can be used.

In an embodiment of the invention the channels for passage of the working medium are formed between neighboring profiled bodies. Preferably, the profiled body at least to a high degree therein have the shape of a double T or an X with closed top and bottom sides in order to create a contact surface being as large as possible. These bodies then are used for filling the space between double sheets. The profiled piece furtheron preferably can be arranged in parallel with one another or can have different lengths.

By the invention, areas of profiled pieces (e.g. zeolite) arranged side-by-side or one behind the other are formed between the double sheets, wherein in the area of constriction of adjacent double T pieces or of the X pieces, respectively, without problem channels are formed for the passing working medium (water) vapor, The double T or X pieces furthermore are designed such that a large-area contact area with the sheets is created, this resulting in good thermal transition in these positions. Since zeolite has a comparatively poor thermal conductivity, the area located at the inside is heated less, however, this effect is of no importance because of the constriction.

In a further embodiment the channels for passage of the working medium are formed in the profiled bodies and extend in longitudinal direction of said profiled bodies. Therein, the profiled bodies also are constructed such that a great contact area to the sheets is formed. Preferably the profiled bodies have a square cross-sectional shape, wherein the channels preferably are arranged in the bodies with axial symmetry to the longitudinal direction of the profiled bodies and have a circular or square cross-section or a square cross-section with rounded corners. Preferably, in each profiled body respectively one channel is arranged along the longitudinal axis in the center of the cross-section of the body. However, a profiled body can also comprise two, three or several neighboring sections with square cross-sectional shape, wherein in each of these sections respectively one channel along the longitudinal axis of the body, preferably in the center of the cross-section of the section, is located. Like in the before-described embodiment, the profiled bodies preferably can be arranged in parallel with one another and have different lenghts. The embodiment just described therein provides the advantage that during insertion of the profiled bodies between the sheets of the sorption unit due to the symmetry of the profiled body no care has to be taken which sides of the body are in touch with the sheets. This simplifies insertion of the profiled bodies.

As the front faces of the profiled piece in accordance with a further embodiment of the present invention are not flat (e.g. broken), they are not located one beside the other in sealing manner so that openings and/or connections, respectively, between the are formed, which care for uninhibited pressure balancing among the channels.

In accordance with a further particularly preferred embodiment of the present invention a plurality of double sheet members are combined to form a sorption/condenser evaporator package arranged one on top of or beside the other, which can be adapted to most different purposes of use in most simple manner by a corresponding geometric design and combination of device components. For example, the condenser output can be increased by corresponding supplementary members and/or additional double sheet layers without ado.

In a particularly preferred air-conditioning apparatus the condenser/evaporator unit and the sorption unit quasi are arranged one on top of the other in a kind of compact system. The units therein are of layer-shaped construction so that e.g. up to 100 "air-conditioning members" each comprising an own sorption and condenser/evaporator units form the complete air-conditioning system. In this case in accordance with the invention a buffer zone and/or a buffer means, respectively, is located between the part of the sorption unit in which the zeolite chains are arranged and the condenser/evaporator part preferably, said buffer zone and/or a buffer means, respectively, preventing that heat emitted in the zeolite part reaches the evaporator (if the evaporator serves for refrigeration).

In accordance with the present invention, said buffer zone is provided with a water separation means which preferably has a construction of a plurality of sheets arranged in parallel with one another, each of which having imprints on both sides, serving as spaces to the respectively adjacent sheet and/or as collection recesses for moisture droplets. Said water separation means is particularly advantageous since due to the extremely violent cooking operation in the evaporation phase due to the vacuum effect of the evaporator too large liquid droplets can be entrained with the vapor streaming into the sorption unit, said droplets entering the zeolite section of the sorption unit and thus reducing the output of the air-conditioning system. This is prevented by the water separator in simple manner in that the water separator more or less "catches" the water droplets and guides them back into the evaporator. Therein, the water separating effect is dimensioned such (by suitable dimensioning of the imprints) that the output of the device is not reduced further, since the passage of the water vapor to the sorption unit per se shall not be influenced negatively. It is only the catching of larger-size water droplets that is desired. In this area of the buffer zone the imprints also are bent upwardly or face downwardly, respectively, on the later marginal areas in order that the stirred water droplets are caught and guide back downwardly into the evaporator. On the other hand, during the regeneration phase of the sorption unit expelled water vapor is to be permitted to condensate on the imprints and to flow down into the condenser/evaporator unit.

With respect to the condenser/evaporator unit the invention reaches its aim by means of the subject matter of claims 3 or 4, respectively. A condenser/evaporator unit for air-conditioning and heat technology systems is created, which also is characterized by liquid separation means, a plurality of sheets arranged in parallel with one another being provided for, each of which has imprints on both sides serving as spacers to the respectively neighboring sheet and/or as collecting recesses for liquid droplets. These imprints in simple manner impede passage of droplets through the condenser/evaporator unit in downward direction and stabilize the mutual position of the sheets.

In accordance with particularly preferred embodiments of the present invention the imprints extend in bends curved downwardly so that they form collecting cups and the mutual distance between the imprints can be variable. The imprints furthermore can be bent further in the closer vicinity of the sorption unit so that the can accommodate more water than the lower spacers. This a/o. is advantageous because in this way a distribution as uniform as possible across the entire condenser/evaporator unit is effected (the amounts of water flowing to the sorption unit increase in direction to the sorption unit). On its path to the sorption unit the vapor thus quasi flows through kind of "labyrinth" in which during streaming about a corner or a bend water droplets in the water vapor are thrown away due to centrifugal forces and get stuck on the water separator of the buffer section or on the spacers of the condenser/evaporator unit so that desirably the water is held back in the condenser/evaporator unit until it is evaporated completely. During the regeneration phase in which the water is expelled from the zeolite the imprints promote the condensation process and guarantee uniform distribution of the water in the condenser/evaporator unit.

In advantageous manner the condenser/evaporator unit can also be built as hollow body in which an inlay out of severely hygroscopic material, like e.g. felt material or glass fiber material, can be inserted with areal extension. In order to avoid that the fibers of the inlay sort out in case of mechanical stress and sediment in the flow cross-sections, it is provided for in advantageous manner that the material is supported on both sides by support structures. These support structures can be formed by sieve sheets e.g., which can comprise imprints for improvement of stability. However, it is advantageous if these imprints are not facing the fibrous material so that they do not cause densification of the material. If several inlays are provided for in layers one on top of the other, it is advantageous if these are spaced from one another by spacers. The spacers can be formed by the support structure itself, wherein it is of advantage that this support structure is made in the shape of a meander, zigzag or waves. For stabilization of the spacers rib-shaped imprints or stampings, which are arranged on alternating sides and with a mutual distance can be provided on the spacers in the sheet metal walls. In addition all sheet metal parts can be surface treated for improvement of hygroscopic properties, wherein this can be achieved by mechanical and/or chemical manner.

From the components sorption unit, buffer zone and condenser/evaporator zone in simple manner a compact, excellently working apparatus of air-conditioning technology, a refrigerating apparatus or a heat pump in particular, can be assembled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

The present invention will become more fully understood from the detailed description given hereinbelow and the accompanying drawings which are given by way of illustration only, and thus are not limitative of the present invention, and wherein:

FIG. 1 shows a section of a sorption unit in accordance with the present invention;

FIG. 2 shows a section of a further preferred embodiment of a sorption unit in accordance with the present invention;

FIG. 3 shows a further section of the embodiment under FIG. 1;

FIG. 4 shows a section X–X' of FIG. 3;

DESCRIPTION OF THE PREFERRED EMBODIMENTS

Figure 9:
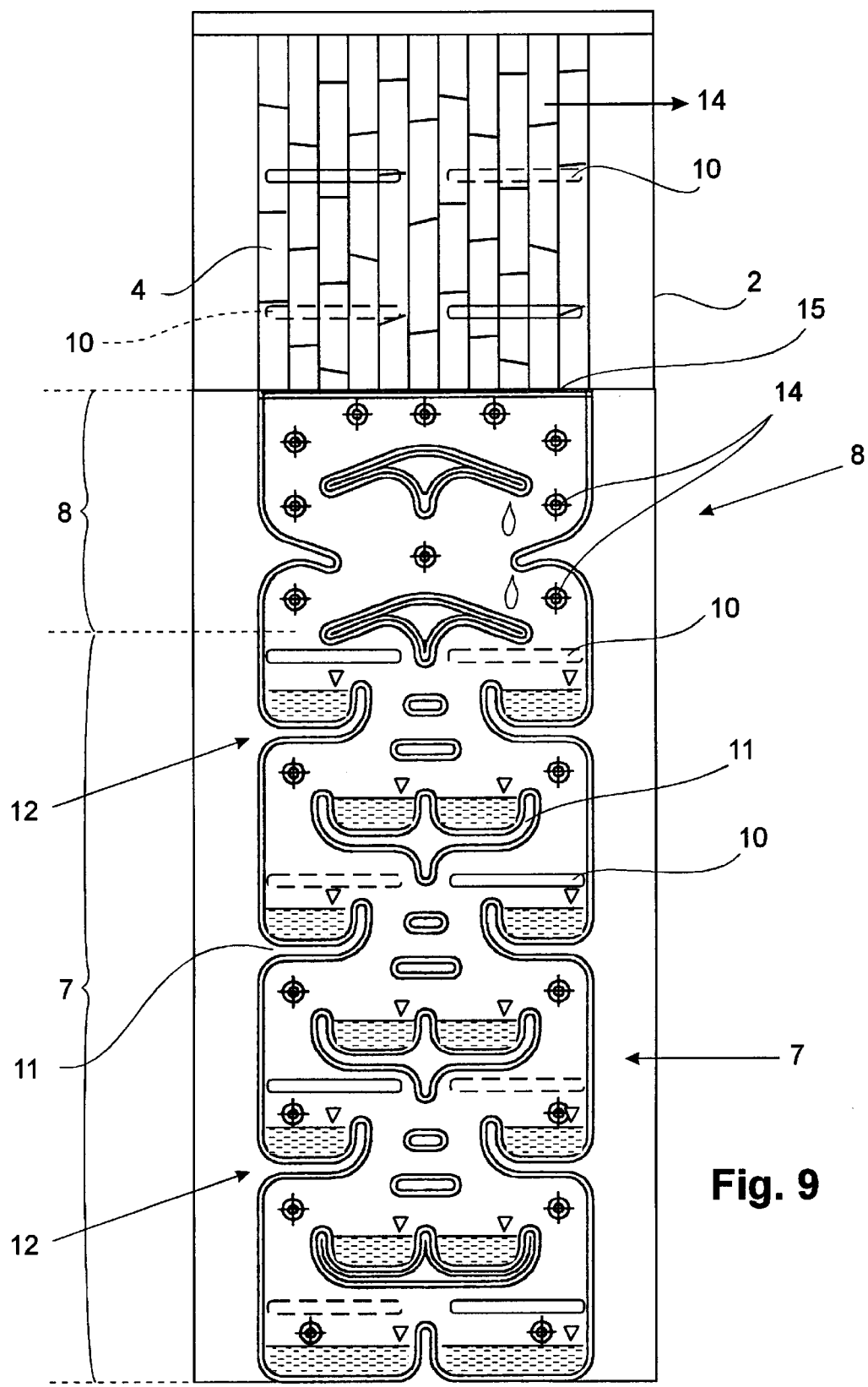
FIG. 9 shows a side view of the embodiment of FIG. 8.
Figure 10:
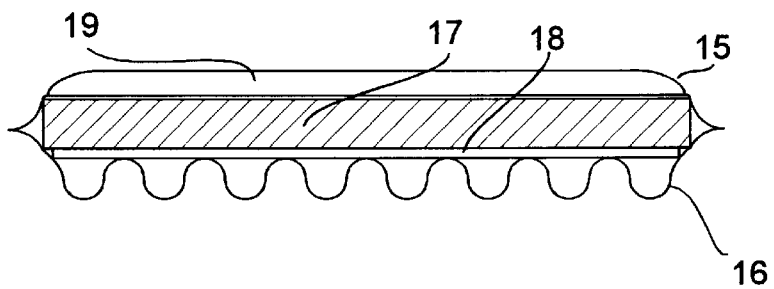
FIGS. 10 to 13 are schematical cross-sectional views of further embodiments of the condenser/evaporator unit in accordance with the present invention.

FIG. 1 shows a section of a sorption unit 2 of an apparatus for air-conditioning and heat technology in accordance with FIG. 9 including sheets for heat emission past which water vapor is guided. Said sheets are built as double sheets with sheet metal walls 3 and 3' which are connected to one another at their ends (e.g. welded). String-shaped zeolite profiled bodies 4 are arranged in the hollow chambers formed by sheets 3 and 3'. These have a double T shape, wherein the top and bottom sides of said double T are in surface contact with said sheets 3 and 3'. In the embodiment of FIG. 2 corresponding facts are true for an "X"-shaped embodiment of said zeolite body 4, wherein said top and bottom sides of said X bodies are formed in closed manner in order to form a surface of contact as large as possible.

The X bodies or double T bodies lying one beside the other, in the area of their constrictions 5 form channels 6 respectively, through which the vapor can pass. During manufacture of the elements 1 (which of course should comprise not only three or four but a plurality of zeolite rows) it only is taken care that "fragments" are arranged in parallel with one another.

As can be seen from FIGS. 3 and 4, it is possible in simple manner to assemble several double sheet elements to form a package of sorption units located one on top and/or beside the other.

An essential advantage of this package of layer-like construction of sorption units has to be seen in that expensive zeolite coating of sheets 3 and 3' is not required. The zeolite pieces simply are put into the respective sheet hollow space and are shifted one against the next.

In the sorption unit and in the entire air-conditioning apparatus, respectively, preferably a pressure is maintained which is lower than atmospheric pressure. Thus the external pressure presses the comparatively thin sheets 3 and 3' against one another and the zeolite bodies are pressed against said sheets 3 and 3' and held in their positions.

FIGS. 5–8 show a condenser/evaporator unit 7 and a buffer section or buffer means 8. Above said buffer means 8 the passage to the sorption unit following in upward direction is somewhat constricted by sheet imprints 15. Thereby it is avoided that the profiled bodies can drop downwardly into said buffer means 8 in case of vertical alignment of the sorption unit 2.

The apparatus components sorption unit 2, buffer means 8 and condenser/evaporator unit 7 (see FIG. 9) are formed as sheet pack, wherein sheets 9a, 9b, 9c etc. each are in parallel with one another and are provided with stampings 10 and imprints 11, 14 on both sides. Said stampings 10 and imprints 11, 14 are arranged such that they develop a combined effect as "flow passage labyrinth", as "water collection pool" and as mechanical "spacer" of sheets 9a, 9b etc. Thus, a condenser/evaporator unit 7 and a buffer section 8 are created which are constructed in surprisingly simple manner and nevertheless are highly efficient. In practical embodiments e.g. between 50 and 100 sheets 9a, 9b are arranged one beside the other, depending on the desired cooling effect.

Thus, in the area of said buffer means—climatic separator—between said sorption unit 2 and said condenser/evaporator unit 7, respectively, one water separation means 12 is formed for water drops of the water vapor flowing to said sorption unit, which drops are entrained with the water vapor or flow upwardly during cooking, so that they do not pass into the sorption unit 2, this otherwise having caused a reduction of efficiency of the air-conditioning apparatus. Or the imprints, respectively, are serving as collecting cups for condensed water vapor in the regeneration phase of the sorption unit. Said imprints 11 for this reason are bent downwardly in the buffer zone 8 in order to stop the water droplets and to guide them away in downward direction, whereas in the condenser/evaporator unit 7 they are bent upwardly in order to serve as collecting cups so that the condensated water is uniformly distributed in the condenser/evaporator unit and does not collect in the lower area only.

Figure 5:
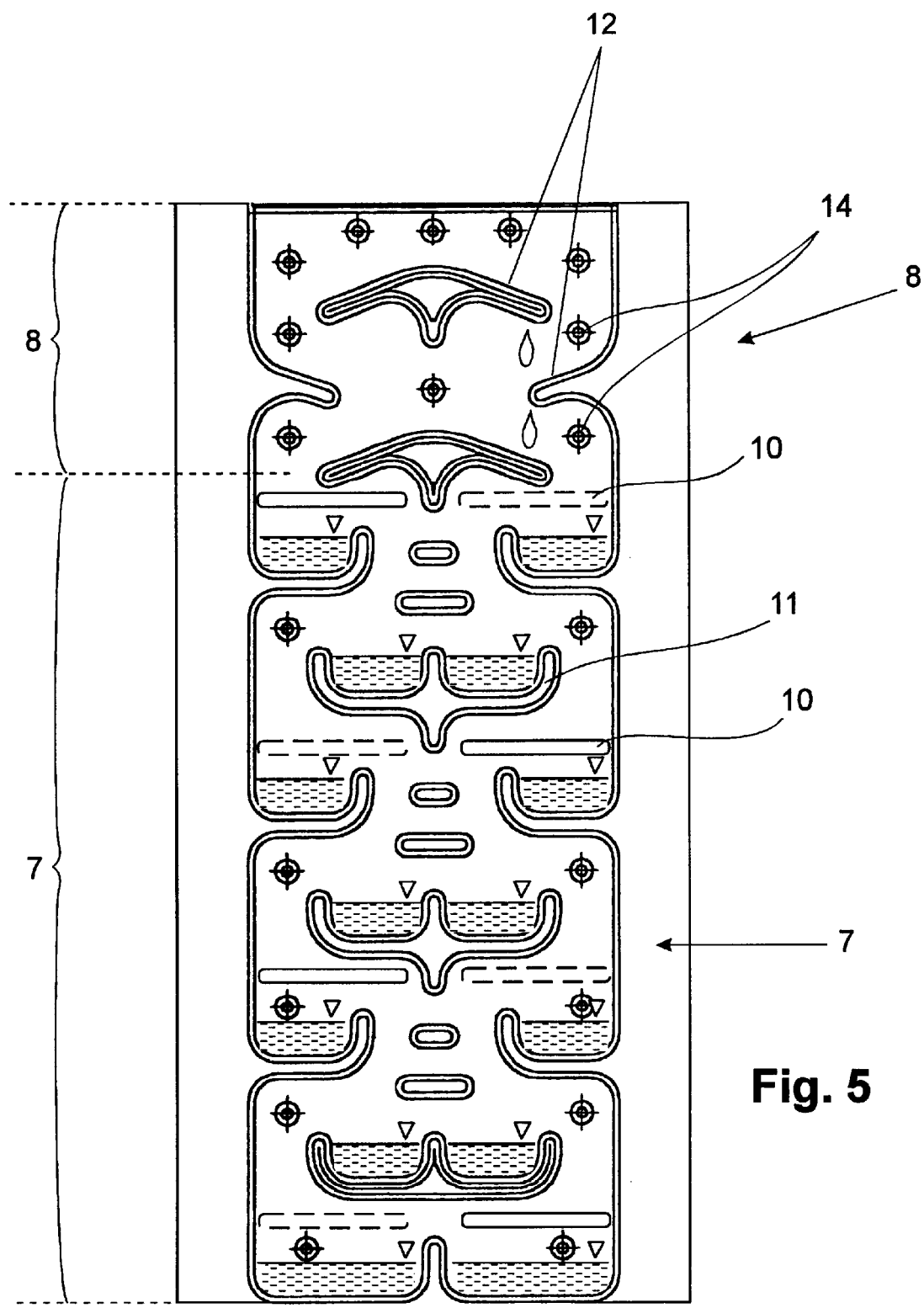
FIG. 5 shows an embodiment of a section of a condenser/evaporator unit and a buffer means in accordance with the present invention in top view.
Figure 6:
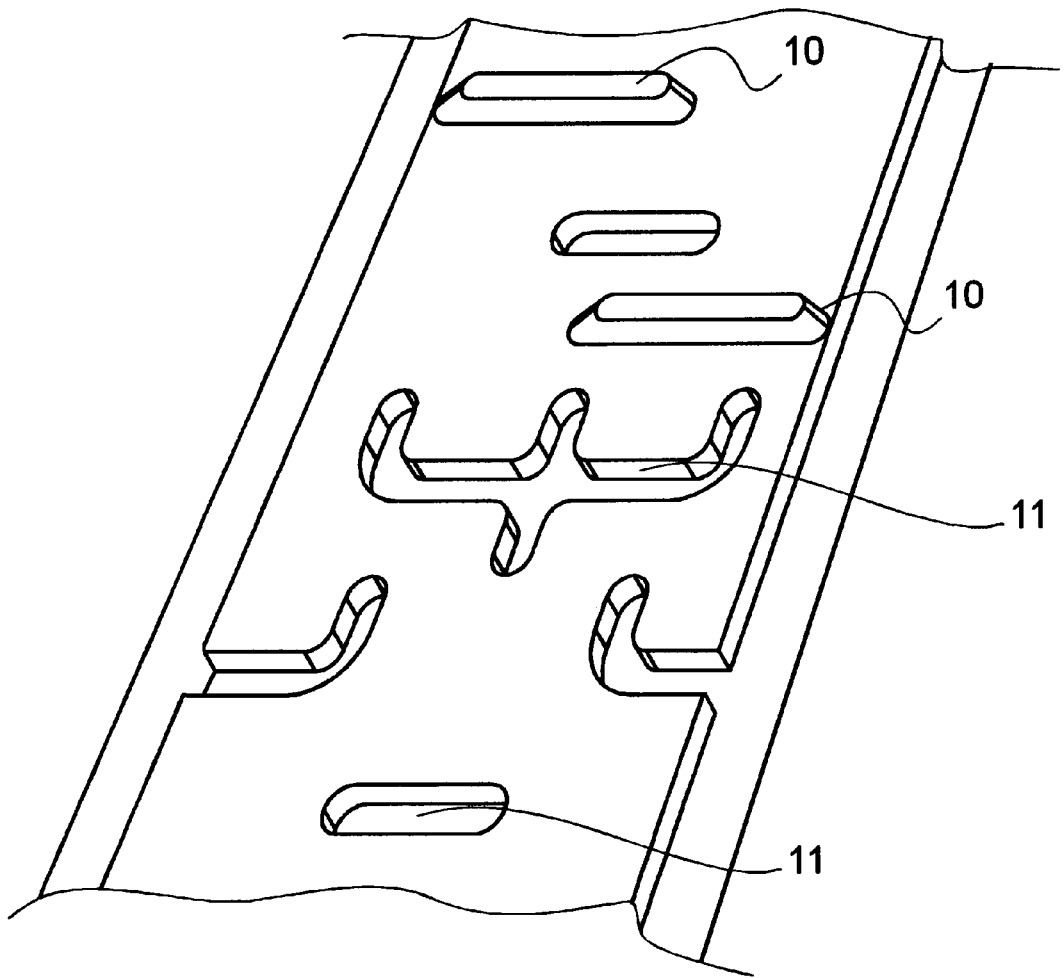
FIG. 6 shows a spatial view of the section of FIG. 5.

As can be seen from FIGS. 5, 6 and 9, the stampings 10 each can be arranged across half of the sorption unit 2 and/or said condenser/evaporator unit 7, respectively, preferably on alternating sides and complement with the stampings 10 of a second sorption unit and/or condenser/evaporator unit, respectively, positioned on said first sorption unit and/or condenser/evaporator unit, respectively, to form a package. Said stampings 10 therein in their mutual compensation serve as continuous spacers across the entire width of the units and in this way in addition form flow channels for guiding a ventilation and air flow from which heat is extracted in the area of said evaporator 7 and/or in the area of said sorption unit 2 for absorption of heat from the exothermic process, in an air-conditioning system. In contrast thereto, the air flow in the regeneration phase of the air-conditioning systems in the area of said sorption unit 2 serves for emitting heat to the zeolite and for cooling during condensation of the water in said condenser/evaporator unit 7.

Figure 7:
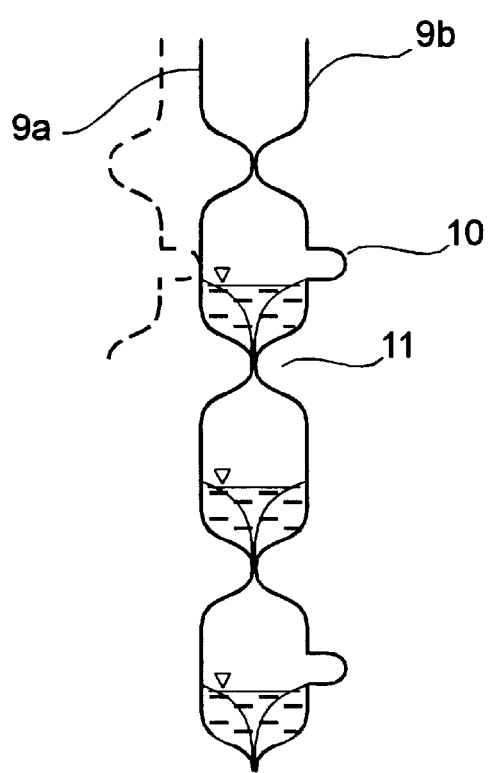
FIG. 7 shows a section A–A' of FIG. 5.
Figure 8:
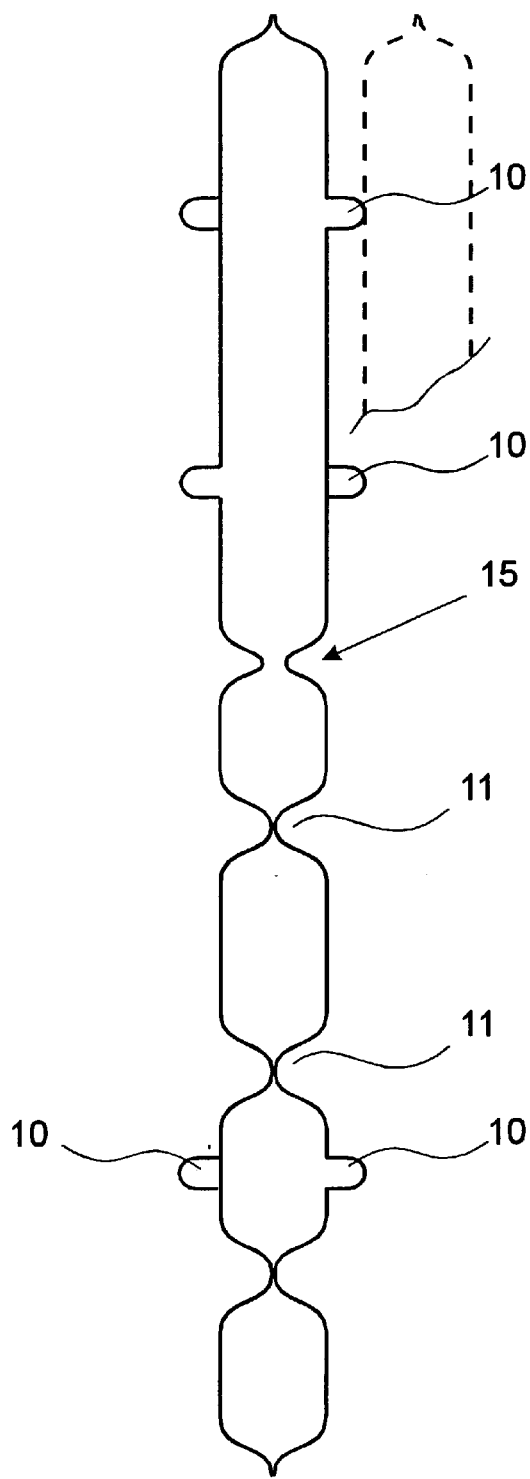
FIG. 8 shows a view of a "layer" of an air-conditioning apparatus in accordance with the present invention.

As can further be taken from FIG. 7, said imprints 11 extending from both sides into the evaporator 7 touch one another and in this way serve as support for the two sheets against one another.

Said imprints 11 are straight in their lower area and are bent in arc-shaped manner in the area of their rims and their distance increases in direction to the sorption unit 2 in order to increase water separation effect as result of the increasing vapor stream in direction to the sorption unit 2.

Said imprints 11 serving as spacers in the upper area of the evaporator 7 can have a somewhat larger curvature so that the collected amount of water there is greater than in the lower area of the evaporator 7 where the water condensate usually collects. In this way it is advantageously achieved that during the cooking operation a distribution as uniform as possible, of the evaporated water across the entire evaporator cross-section of the condenser/evaporator unit 7 is effected. On their bottom side they can comprises edge-shaped guide fins caring that the water is guided downwardly even in case of an inclination of the air-conditioning apparatus (if it e.g. is arranged in a caravan driving on a sloping road or subject to delay or acceleration processes).

For improvement of water distribution the condenser/evaporator unit, the upper surface of the sheets can be roughened mechanically and/or chemically.

FIG. 9 shows how a sorption unit 2 in accordance with the present invention, a condenser/evaporator unit 7 in accordance with the present invention and a buffer section 8 in accordance with the present invention can be combined to form a "layer-like" and compact air-conditioning system consisting of individual storage members. Therein, the individual storage members are laid one on top of the other, the surfaces being kept at a distance by the stampings 10 serving as spacers. The cross channels formed by the spacers serve for guiding air. Said channels have an essentially constant cross-sectional area so that an uniform air flow is created and the air in the evaporator area can be cooled uniformly. On the other hand the heat created during exothermic reaction in the condenser area of said sorption unit 2 is well guided away by the air stream.

Said condenser/evaporator unit 7 and said sorption unit 2 can be directly connected by said buffer section 8, as is shown in FIG. 9. It is, however, also conceivable that said condenser/evaporator unit 7 and said sorption unit 2 are in mutual connection through an elongated pipeline, wherein said pipeline itself can be built as condenser, in that corresponding cooling ribs are arranged on its outside so that the water vapor created in the expellation phase in which the water contained in the zeolite is expelled by heat supply and said sorption unit 2 is regenerated is condensated out in the area of the pipeline and returns into said evaporator 7 as water. It also is possible to arrange a valve in said pipeline, by means of which the connection between said evaporator 7 and said sorption unit 2 is closed temporarily and only is opened when refrigeration is requested.

Alternative embodiments for the condenser/evaporator unit in accordance with the present invention result form FIGS. 10 to 14. The hollow body of said condenser/evaporator unit consists of two sheet metal semicups 15, 16 mutually connected on the edge e.g. by rotary welding, between which an inlay 17 of severely hygroscopic material is received. As said inlay is made from glass fiber material or felt material, a support structure 18 formed by a sieve sheet is provided for avoiding disintegration of the fibrous structure because of mechanical stress. At the bottom side the sheet metal cup 15 has rib-shaped stampings 19 serving as spacers for a further condenser/evaporator unit.

Figure 11:
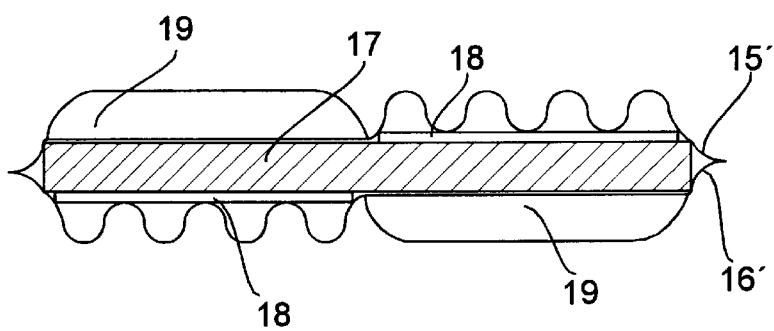

The condenser/evaporator unit shown in FIG. 11 is formed similar to the previous embodiment, but on both sides of the inlay 17 sieve sheets 18 are provided for, said sieve sheets each only extending across the wave-shaped area of the respective sheet semicup, since the opposite side of the inlay is covered by the sheet semicup itself. In addition, said spacers 19 are shortened in their longitudinal extension, but are arranged on alternating sides on the surface of the respective sheet semicup 15' and/or 16', respectively. The wave-shaped areas of said sheet semicups form channels extending in longitudinal direction, through which the water vapor is passing.

Figure 12:
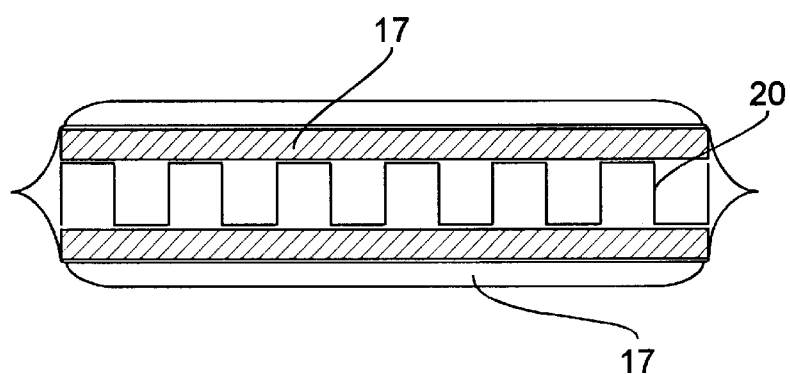
Figure 13:
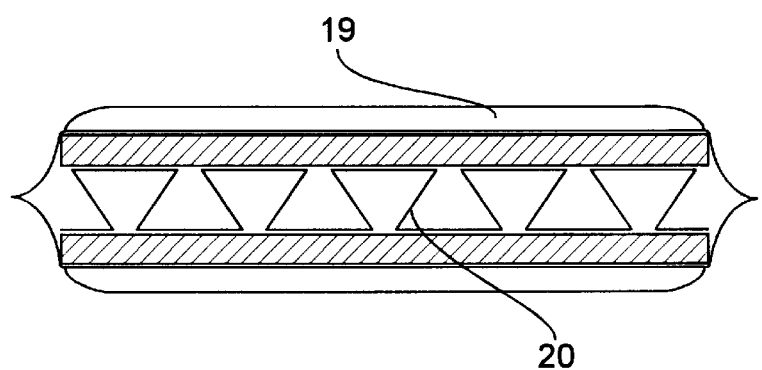
Figure 14:
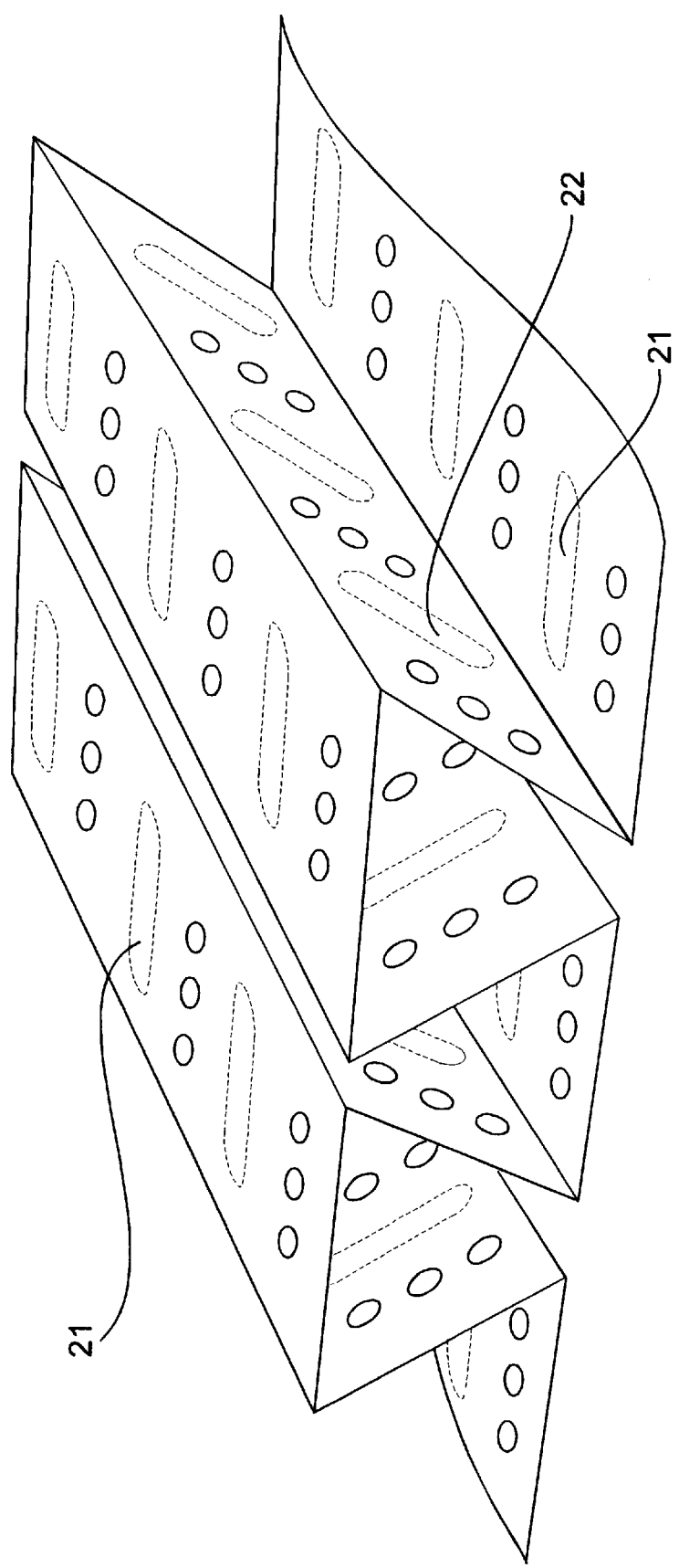
FIG. 14 shows a detailed view of the sectional view under FIG. 13 in perspective and enlarged representation.

In the embodiment in accordance with FIG. 12 two inlays 17 are provided for which are kept on distance by means of a spacer 20. Said spacer 20 can also be formed by a sieve sheet which is bent in essentially meander shape. The sheet can also be bent in zigzag form, as shown in the embodiment in accordance with FIG. 13, wherein imprints and stampings 21, 22 are provided for in the web area and in the respective support surfaces. Said imprints and/or stampings, respectively, serve for stabilization of the comparatively thin-walled sheet. It is advantageous if said stampings are not located in the area of the support surfaces of the inlays, as it is to be avoided that the inlays are densified in these positions. Rather does the stampings then extend in the space between said inlays or in the support area to the direction not facing the inlay.

Of course, all sheets and support structures can be surface treated for improvement of water absorption capacity, wherein this can be done mechanically and/or chemically in the sense of a roughening. If the sieve sheets in addition are manufactured from copper e.g., thermal conductivity is essentially improved so that the grooves extending in longitudinal direction also work as heat carriers.

What is claimed:

1. An apparatus for a refrigerating apparatus or heat pump, comprising a sorption unit (2), a condenser/evaporator unit (7), and a buffer means (8) disposed between the sorption unit and the condenser/evaporator unit, wherein said sorption unit comprises sheets for thermal conduction past which a working medium is guided, said sheets being in contact with a sorption medium, wherein said sorption medium forms string-shaped profiled bodies (4) which are designed to create surface contact with said sheets (3, 3') and wherein channels (6) for passage of the working medium are formed by said string-shaped profiled bodies (4), said condenser/evaporator unit (7) comprises a first liquid separation means for removal of liquid, said first separation means comprising a plurality of separating sheets arranged in parallel with one another, each of said separating sheets having imprints (11, 14) on both sides which serve as spacers to the respectively neighboring separating sheet and/or as collector recesses for liquid droplets, and said buffer means comprises a second separation means (12) for removal of water.

2. The apparatus for air-conditioning technology as defined in claim 1, wherein at least one of said sorption unit (2), said buffer means (8), and said condenser/evaporator unit (7) include stampings (10) which define cross channels when sheets defining said sorption unit (2), said buffer means (8), and/or said condenser/evaporator unit (7) are stacked, said cross channels permitting an air flow to be created.

3. The apparatus for air-conditioning technology as defined in claim 2, wherein said stampings (10) each extend at alternating sides across a part of the width of said at least one of said sorption unit (2), said buffer means (8), and said condenser/evaporator unit (7) and are arranged on both surfaces of said sheets defining said sorption unit (2), said buffer means (8), and/or said condenser/evaporator unit (7).

4. The apparatus for air-conditioning technology as defined in claim 1, wherein an interior of the apparatus is maintained at a sub-atmospheric pressure during operation of said apparatus.

5. The apparatus for air-conditioning technology as defined in claim 1, wherein sheet metal walls of at least one of said buffer means (8) and said condenser/evaporator unit (7) are roughened mechanically and/or chemically.

6. The apparatus for air-conditioning technology as defined in claim 1, wherein said apparatus is formed out of several packages, each of said packages including said sorption unit (2), buffer means (8) and condenser/evaporator unit (7), and wherein an air stream is forcibly passed therethrough such that waste heat absorbed by a cool air stream of the one sorption unit is used for regeneration of the following sorption unit.

\* \* \* \* \*